(12) United States Patent
Kato

(10) Patent No.: US 10,288,873 B2
(45) Date of Patent: May 14, 2019

(54) PHOSPHOR WHEEL, PROJECTOR, AND METHOD OF MANUFACTURING PHOSPHOR WHEEL

(71) Applicant: NEC Display Solutions, Ltd., Tokyo (JP)

(72) Inventor: Atsushi Kato, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 15/772,486

(22) PCT Filed: Jul. 1, 2016

(86) PCT No.: PCT/JP2016/069635
§ 371 (c)(1),
(2) Date: Apr. 30, 2018

(87) PCT Pub. No.: WO2017/081885
PCT Pub. Date: May 18, 2017

(65) Prior Publication Data
US 2018/0329201 A1    Nov. 15, 2018

(30) Foreign Application Priority Data
Nov. 10, 2015    (WO) ............ PCT/JP2015/081586

(51) Int. Cl.
*G02B 26/00*    (2006.01)
*F21V 9/40*    (2018.01)
(Continued)

(52) U.S. Cl.
CPC ............. *G02B 26/008* (2013.01); *F21V 9/30* (2018.02); *F21V 9/40* (2018.02); *G03B 21/14* (2013.01); *G03B 21/204* (2013.01); *G03B 33/08* (2013.01)

(58) Field of Classification Search
CPC .... G03B 21/14; G03B 21/145; G03B 21/204; G02B 26/02; G02B 26/007; G02B 26/008;
(Continued)

(56) References Cited

U.S. PATENT DOCUMENTS

2009/0273763 A1    11/2009  Kjaer
2013/0169938 A1*   7/2013   Huang ............... G03B 21/16
                                                353/31

(Continued)

FOREIGN PATENT DOCUMENTS

JP    2010-174246 A    8/2010
JP    2011-117989 A    6/2011
(Continued)

OTHER PUBLICATIONS

International Search Report (ISR) (PCT Form PCT/ISA/210), in PCT/JP2016/069635, dated Aug. 23, 2016.

*Primary Examiner* — Sultan Chowdhury
(74) *Attorney, Agent, or Firm* — McGinn IP Law Group, PLLC

(57) ABSTRACT

A phosphor wheel is obtained by providing a phosphor on a rotatable substrate. The phosphor is formed of a plurality of small pieces, and the small pieces are arranged such that the phosphor has a ring shape, or a shape obtained by cutting away a portion from a ring shape about an axis of rotation of the substrate.

17 Claims, 13 Drawing Sheets

(51) Int. Cl.
  *F21V 9/30*   (2018.01)
  *G03B 21/20*  (2006.01)
  *G03B 21/14*  (2006.01)
  *G03B 33/08*  (2006.01)

(58) Field of Classification Search
  CPC .. H04N 9/3111; H04N 9/3114; H04N 9/3158; H04N 9/3161
  See application file for complete search history.

(56) References Cited

U.S. PATENT DOCUMENTS

| | | | | |
|---|---|---|---|---|
| 2014/0078168 A1* | 3/2014 | Masuda | ............... | F21V 9/00 345/589 |
| 2014/0185272 A1* | 7/2014 | Kishimoto | ............ | F21V 14/08 362/84 |
| 2014/0254133 A1* | 9/2014 | Kotter | ............... | C09K 11/02 362/84 |
| 2015/0036107 A1* | 2/2015 | Nagahara | ............ | G03B 21/208 353/31 |
| 2015/0252978 A1* | 9/2015 | Ueda | ............... | F21K 9/00 353/31 |
| 2015/0346594 A1* | 12/2015 | Shimizu | ............ | G03B 21/204 353/31 |
| 2016/0165194 A1* | 6/2016 | Hartwig | ............. | G02B 26/008 353/31 |

FOREIGN PATENT DOCUMENTS

| | | |
|---|---|---|
| JP | 2010-256457 A | 11/2011 |
| JP | 2012-008303 A | 1/2012 |
| JP | 2012-098438 A | 5/2012 |
| JP | 2012-129135 A | 7/2012 |
| JP | 5530165 B2 | 6/2014 |
| JP | 2015-094777 A | 5/2015 |
| JP | 2015-118139 A | 6/2015 |
| WO | WO 2013/021773 A1 | 2/2013 |
| WO | WO 2015/10854 A1 | 9/2015 |

* cited by examiner (a)　　　　　　　　　　　　(b)

(a) (b)

(a)  (b)  (c)

PHOSPHOR WHEEL, PROJECTOR, AND METHOD OF MANUFACTURING PHOSPHOR WHEEL

FIELD OF THE INVENTION

The present invention relates to a phosphor wheel, a projector, and a method of manufacturing a phosphor wheel.

BACKGROUND OF THE INVENTION

There is known a white LED where an LED (Light Emitting Diode) generating blue light and a phosphor generating yellow fluorescence that are combined with each other thus generating white light. In white LEDs of this type, to realize high luminance, high reliability, and long lifetime, an emitting color conversion member where an inorganic phosphor is mixed into a glass is disclosed in Patent Literature 1 (JP2010-174246A). Compared with a white LED formed of a mixture of a yellow phosphor and a transparent resin, the white LED disclosed in Patent Literature 1 has an advantageous point that performance degradation of the white LED minimally diminishes due to deterioration of a resin.

There has been known a light source device and a projector which use a phosphor wheel where a phosphor is formed on a rotatable disk. The phosphor on the phosphor wheel is irradiated with excitation light such as blue light, and generated green fluorescence and yellow fluorescence are used as illumination light for a micro display of a liquid crystal panel or a DMD or the like. A light source device and a projector of this type can obtain fluorescence that has high luminance up to a certain level corresponding to the intensity of excitation light that irradiates a phosphor. Conventionally, a device where a fluorescent material which emits yellow color or the like is dispersed into a resin binder, and the mixture is applied and fixed to a substrate is, in fact, already being used. Patent Literature 2 (Japanese Patent No. 5530165) discloses a device where a plate-like inorganic phosphor is fixed on a substrate by adhesion or the like.

An inorganic phosphor exhibits desirable reliability with respect to irradiation of strong excitation light and hence, a projector which projects a bright image can be realized. Examples of an inorganic phosphor or phosphor ceramic include dispersing phosphor powder into a glass, a glass phosphor where emission center ions are added to a glass parent, a single crystal of a phosphor, a polycrystalline body of a phosphor or the like.

According to Patent Literature 2, a method of manufacturing such an inorganic phosphor includes a starting material mixing step, a molding step, a sintering step, and a processing step. For example, when $Y_3Al_5O_{12}:Ce^{3+}$ phosphor is used as a yellow phosphor, oxides of constituent elements of $Y_3Al_5O_{12}:Ce^{3+}$ phosphor such as a yttrium oxide, a cerium oxide, and alumina, and carbonate, nitrate, sulfate and the like which become oxides after sintering are used as starting materials. These materials are proportioned so as to satisfy a stoichiometric ratio, and are sufficiently dispersed and mixed with each other using water or an organic solvent by a wet ball mill.

Next, the mixture is molded into a predetermined shape. For a molding method, a uniaxial pressure method, a cold isostatic pressing method, a slip casting method, an injection molding method or the like can be used. The obtained molded body is burned at 1600 to 1800° C. With such processing, $Y_3Al_5O_{12}:Ce^{3+}$ phosphor ceramic can be obtained. The sintered body obtained as described above is polished so as to have a thickness of several tens to several hundreds of pin by an automatic polishing device or the like. Further, the sintered body is cut into a plate having a desired shape such as a circular shape, a quadrangular shape, a fan shape, or a ring shape by dicing or by scribing using a diamond cutter or a laser, and the sintered body obtained as described above is used. The above-mentioned technique is disclosed.

When thinking about manufacturing a phosphor wheel with φ30 or φ50, or greater than φ70 in large phosphor wheels, first, a cylindrical sintered body of a phosphor is produced corresponding to the outer shape of a substrate. Usually, a phosphor wheel is formed such that an inorganic phosphor plate having a toroidal shape or a C shape obtained by cutting away a portion from a toroidal shape is fixed on a circular substrate. Accordingly, to produce an inorganic phosphor plate having a toroidal shape, a cylindrical sintered body is sliced thus obtaining an inorganic phosphor plate. On the other hand, to produce an inorganic phosphor plate having a C shape, a cut-away portion is further formed on the sliced sintered body. Then, the plate-like inorganic phosphor is fixed to the substrate by adhesion or the like. That is, a cylindrical sintered body of a phosphor is prepared corresponding to the outer shape of the substrate. According to cases, arcuate sintered bodies may be obtained where an inorganic phosphor plate having a toroidal shape is split into three or four members.

DESCRIPTION OF RELATED ART

Patent Literature

Patent Literature 1: JP2010-174246A
Patent Literature 2: Japanese Patent No. 5530165

SUMMARY OF THE INVENTION

Technical Problem

A manufacturer of projectors may often produce a plurality of products having different performances or specifications at the same time. For example, assume that the plurality of products require phosphor wheels having an outer shape with φ50 and phosphor wheels having an outer shape with φ90. In this case, two kinds of inorganic phosphor plates which correspond to φ50 and φ90 are required. Assuming each of both phosphor plates that adhere to a substrate has a toroidal shape and has the same property, a method of efficiently manufacturing these phosphor plates is studied. In such a case, it is common to conclude that phosphor plates having a shape obtained by splitting a toroidal shape will be prepared, and the obtained phosphor plates are used. However, there is a problem that the phosphor plate which can be used in both a phosphor wheel with φ90 and a phosphor wheel with φ50 in the same manner cannot be manufactured. This is because the phosphor wheel with φ90 and the phosphor wheel with φ50 respectively include phosphor plates each having a different radius. Accordingly, with regard to steps, in the case where these phosphor wheels are manufactured simultaneously, it is necessary to individually prepare a manufacturing device for phosphor wheels with φ90 and a manufacturing device for phosphor wheels with φ50. For this reason, investment for the manufacturing devices is required. Such investment is a large financial burden.

On the other hand, assume that a phosphor plate for a phosphor wheels with φ50 and a phosphor plate for a phosphor wheels with φ90 are manufactured in turn using the same manufacturing device. In this case, the total number of obtainable phosphor wheels is reduced thus giving rise to a problem of reduced productivity. A manufacturer operates on a monthly or annular production plan so that efficient production of phosphor wheel products is required.

The present invention realizes a phosphor wheel capable of enhancing productivity and improving yield.

Solution to Problem

A phosphor wheel according to the present invention is a phosphor wheel having a phosphor provided on a rotatable substrate, wherein
said phosphor is formed of a plurality of small pieces, and
said small pieces have a shape obtained by cutting away a portion from a substantially disk shape, and are formed around an axis of rotation of said substrate.

A projector according to the present invention includes the above-mentioned phosphor wheel.

A method of manufacturing a phosphor wheel according to the present invention is a method of manufacturing a phosphor wheel having a phosphor provided on a rotatable substrate, comprises the steps of
forming said phosphor having a shape obtained from a plurality of small pieces, which are arranged around an axis of rotation of said substrate, by cutting away a portion from a substantially disk shape.

Advantageous Effects of Invention

The phosphor wheel of the present invention can provide advantageous effects in which productivity is enhanced and yield can be improved.

BRIEF DESCRIPTION OF DRAWINGS

FIG. 2 is a view for describing the exemplary embodiment according to the present invention in which FIG. 2(a) is a front view, and FIG. 2(b) is a cross-sectional view.

FIG. 11 is a view for describing the fifth exemplary embodiment of the phosphor wheel according to the present invention in which FIG. 11(a) is a front view, and FIG. 11(b) is a cross-sectional view.

DESCRIPTION OF THE PREFERRED EMBODIMENTS

Next, exemplary embodiments of the present invention are described with reference to drawings.

First Exemplary Embodiment

Figure 1:
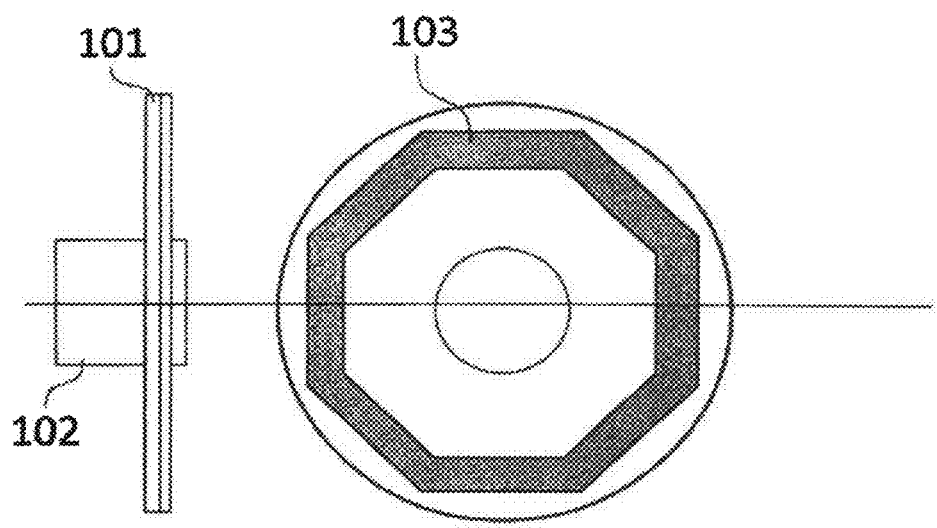
FIG. 1 is a side view and a front view showing the configuration of a first exemplary embodiment of a phosphor wheel according to the present invention.

FIG. 1 is a side view and a front view showing the configuration of a first exemplary embodiment of a phosphor wheel according to the present invention. As shown in the side view on the left side in FIG. 1, substrate 101 is configured to be rotatable in combination with the motor 102. As shown in the front view on the right side in FIG. 1, phosphor layer 103 is formed on substrate 101.

Substrate 101 is formed of a metal plate, a glass plate or the like. Depending on the usage of a phosphor wheel, the phosphor wheel may be used as a reflective phosphor wheel or a transmissive phosphor wheel. A transmissive substrate or a reflective substrate may be properly employed according to the respective usage. A shape of substrate 101 may be a polygonal shape besides the circular shape shown in the drawing.

Phosphor layer 103 is made of a glass matrix and phosphor dispersed in the glass matrix. Inorganic phosphor particles are used for the phosphor. Phosphor is not particularly limited provided that the phosphor emits fluorescence under irradiation by excitation light. For example, an oxide phosphor, a nitride phosphor, an acid nitride phosphor, a sulfide phosphor, a garnet based compound phosphor or the like may be used. When blue light is used as excitation light, it is preferable to use a material which can obtain fluorescence of green light, yellow light, or red light.

Figure 2:
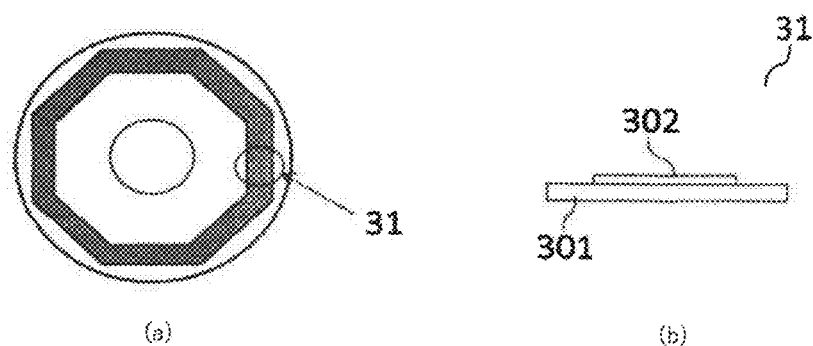

Explanation of the cross-sectional configuration of the phosphor wheel is described by taking a portion surrounded by circle 31 in FIG. 2(a) as an example. As shown in FIG. 2(b), phosphor layer 302 is formed on substrate 301. When a phosphor wheel is used as a reflective phosphor wheel, a metal substrate, a transparent glass substrate or the like is used as substrate 301. Assume that a surface of substrate 301 which is in contact with phosphor layer 302 is a front surface of substrate 301, and a surface of substrate 301 on the side which is not in contact with phosphor layer 302 is a back surface of substrate 301. In this case, a reflective layer is formed on the front surface side of substrate 301 by vapor deposition, sputtering or the like. It is desirable for the reflective layer to have a property of reflecting light in a wavelength band of excitation light, and light in a wavelength band of fluorescence generated by excitation light. On the other hand, when a phosphor wheel is used as a transmissive phosphor wheel, it is desirable to form, on the front surface or the back surface of substrate 301, a thin film having a property of allowing excitation light to pass therethrough, and a property of reflecting fluorescence. A thin film having such properties can be easily realized by a well-known technique.

Figure 3:
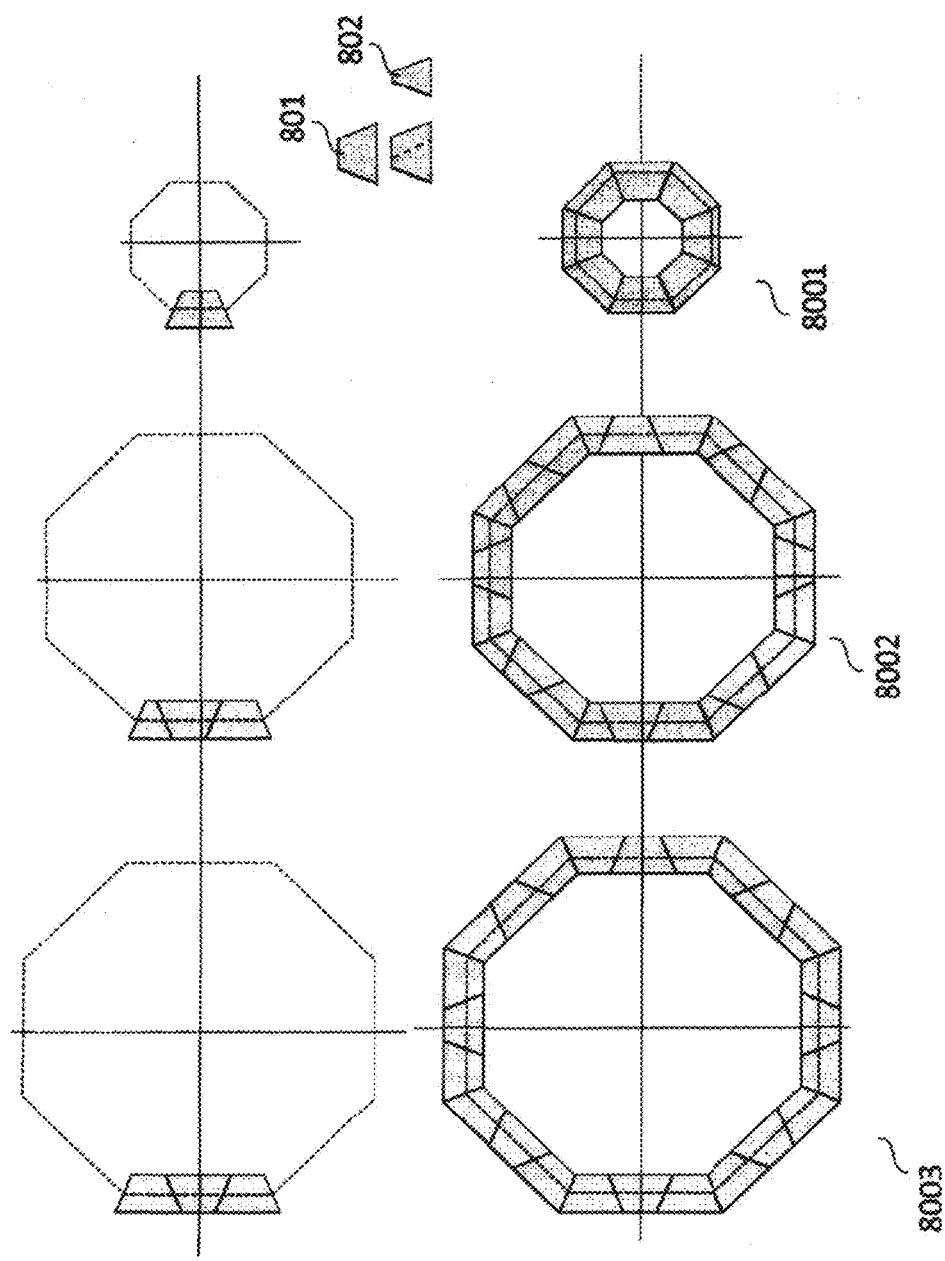
FIG. 3 is a front view showing the configuration of phosphor-plate small pieces and a phosphor layer used in the first exemplary embodiment of the phosphor wheel according to the present invention.

As shown in FIG. 1, phosphor layer 103 is a regular octagonal ring shape as a whole. As shown in FIG. 3, the regular octagonal ring shape is formed of trapezoidal phosphor-plate small pieces 801 and trapezoidal phosphor-plate small pieces 802 which are obtained by further cutting phosphor-plate small piece 801 into a smaller piece. Since each small piece 802 is formed of a portion of small piece 801, small pieces 801 and small pieces 802 are manufactured in the same step. Each small piece 802 can be obtained by cutting small piece 801 into a smaller piece. To be more specific, a sintered body of an inorganic phosphor having the shape of small piece 801 is obtained by the above-mentioned manufacturing method. The sintered body is sliced thus obtaining small piece 801. Obtained small piece 801 is further cut into a smaller piece thus obtaining small piece 802. Such a manufacturing method is also adopted in the same manner in manufacturing small pieces described in the following respective exemplary embodiments.

In FIG. 3, phosphor layer 8001 is obtained by arranging eight small pieces 801 in a regular polygonal shape. Phosphor layer 8001 has a regular octagonal shape. Trapezoidal small pieces can be arranged without a gap, and fixed to the substrate by adhesion or the like. Due to the structure of the phosphor wheel, a motor or the like is mounted at a center portion of the substrate and hence, the phosphor plate having a regular octagonal shape is a ring shape. By changing the combination of phosphor-plate small pieces 801 and small pieces 802, regular octagonal shapes having different sizes can be formed. For example, phosphor layer 8002 in FIG. 3 may be formed where two small pieces 801 and one small piece 802 form each side of a polygonal shape, or phosphor layer 8003 in FIG. 3 may be formed where three small pieces 801 form each side of a polygonal shape. Phosphor layer 8001 corresponds to φ25, phosphor layer 8002 corresponds to φ60, and phosphor layer 8003 corresponds to φ70. Besides the above, by increasing elements for forming each side, a phosphor layer having a larger outer shape can be formed. Further, by a method of producing small piece 802 which is formed by cutting small piece 801, a phosphor layer having a specification other than an outer shape shown in FIG. 3 can also be manufactured.

Figure 4:
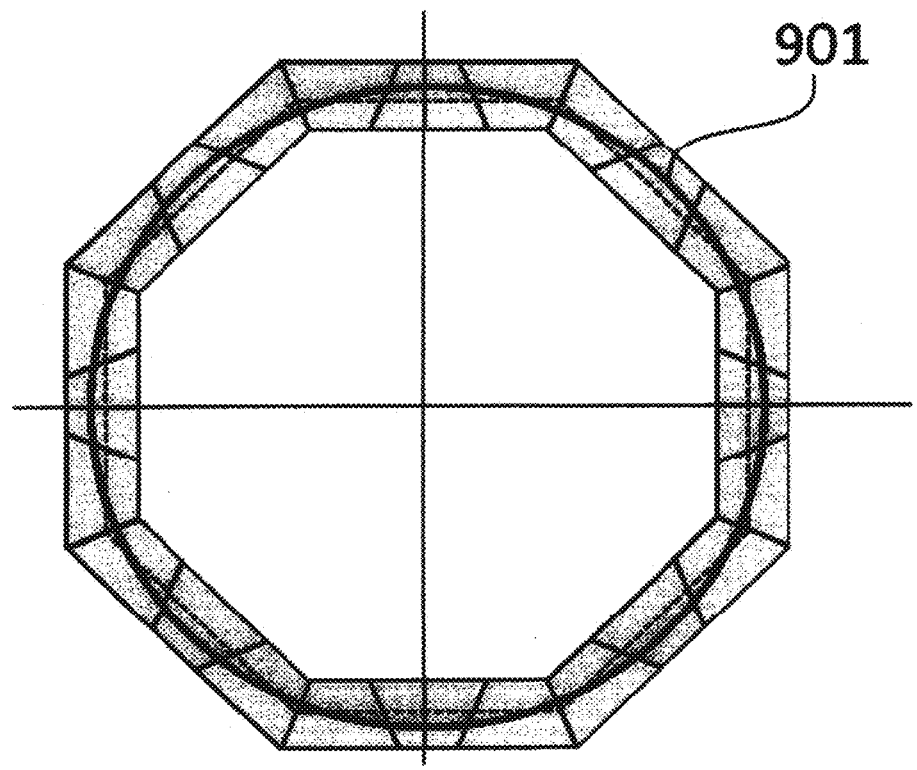
FIG. 4 is a view for describing the configuration of the first exemplary embodiment of the phosphor wheel according to the present invention.

Regarding the phosphor wheel having a phosphor layer of a regular octagon as a whole and each side being composed of three small pieces 801, FIG. 4 is a view showing the position where excitation light is condensed when the phosphor wheel performs a rotation operation. Excitation light is incident on a portion indicated by circle 901 in FIG. 4. Phosphor-plate small pieces are fixed so as to form a regular octagonal shape without a gap and hence, the phosphor is always irradiated with excitation light thus realizing a fluorescent source of high luminance which can continuously obtain fluorescence.

Also in phosphor layer 8001 and phosphor layer 8002 shown in FIG. 3, in the same manner as the phosphor layer shown in FIG. 4, phosphor-plate small pieces are arranged without a gap and hence, the position irradiated with excitation light forms a circular shape on the phosphor plate so that fluorescence can be continuously obtained. The important point is that, in principle, the manufacture of a phosphor plate requires only the preparation of a manufacturing facility and manufacturing steps for manufacturing small pieces 801. That is, phosphor wheels having different outer shapes can be manufactured from individual phosphor plates. Accordingly, productivity and the production yield can be enhanced and hence, the plan for producing projector devices can be changed in a flexible manner and, further, inventory problems can be reduced.

Figure 5:
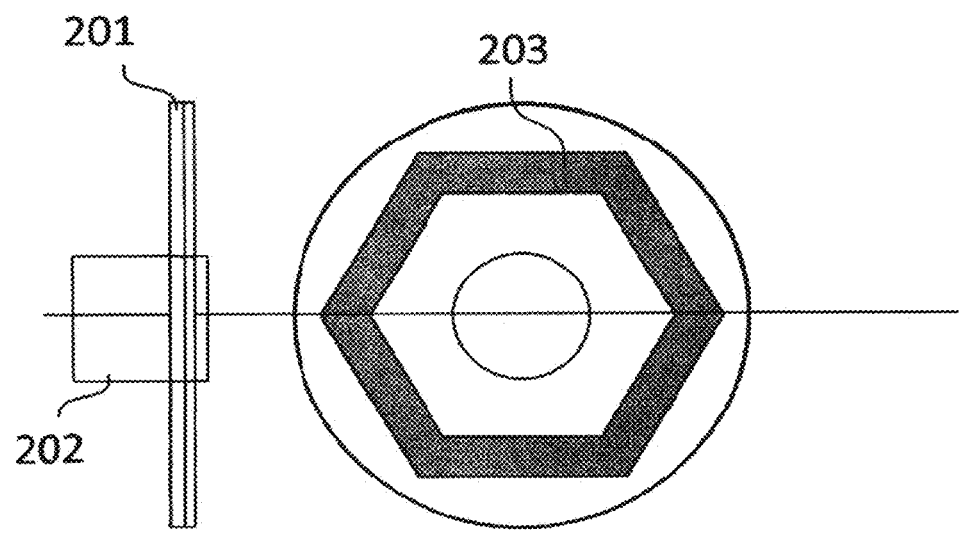
FIG. 5 is a view for describing the configuration of the first exemplary embodiment of the phosphor wheel according to the present invention.

In this exemplary embodiment, phosphor-plate small pieces 801, 802 are prepared so as to form a phosphor layer into a regular octagonal shape as a whole. However, it is not always the case where a regular octagonal shape is an optimum shape, and a phosphor layer may also be formed into another polygonal shape. For example, as shown in FIG. 5, phosphor layer 203 having a regular hexagonal shape may be formed on substrate 201 which is combined with motor 202.

Second Exemplary Embodiment

In the first exemplary embodiment, the configuration is described where the phosphor-plate small pieces have a trapezoidal shape so as to allow the phosphor layer on the substrate to be formed into a regular polygonal shape where the phosphor plates are arranged without a gap. On the other hand, in this exemplary embodiment, with respect to a specification of an outer shape, a slight gap may be formed at a portion between phosphor-plate small pieces that are disposed adjacent to each other. The phosphor-plate small pieces have a single square shape or a single rectangular shape, and a phosphor layer is formed by combining these phosphor-plate small pieces.

Figure 6:
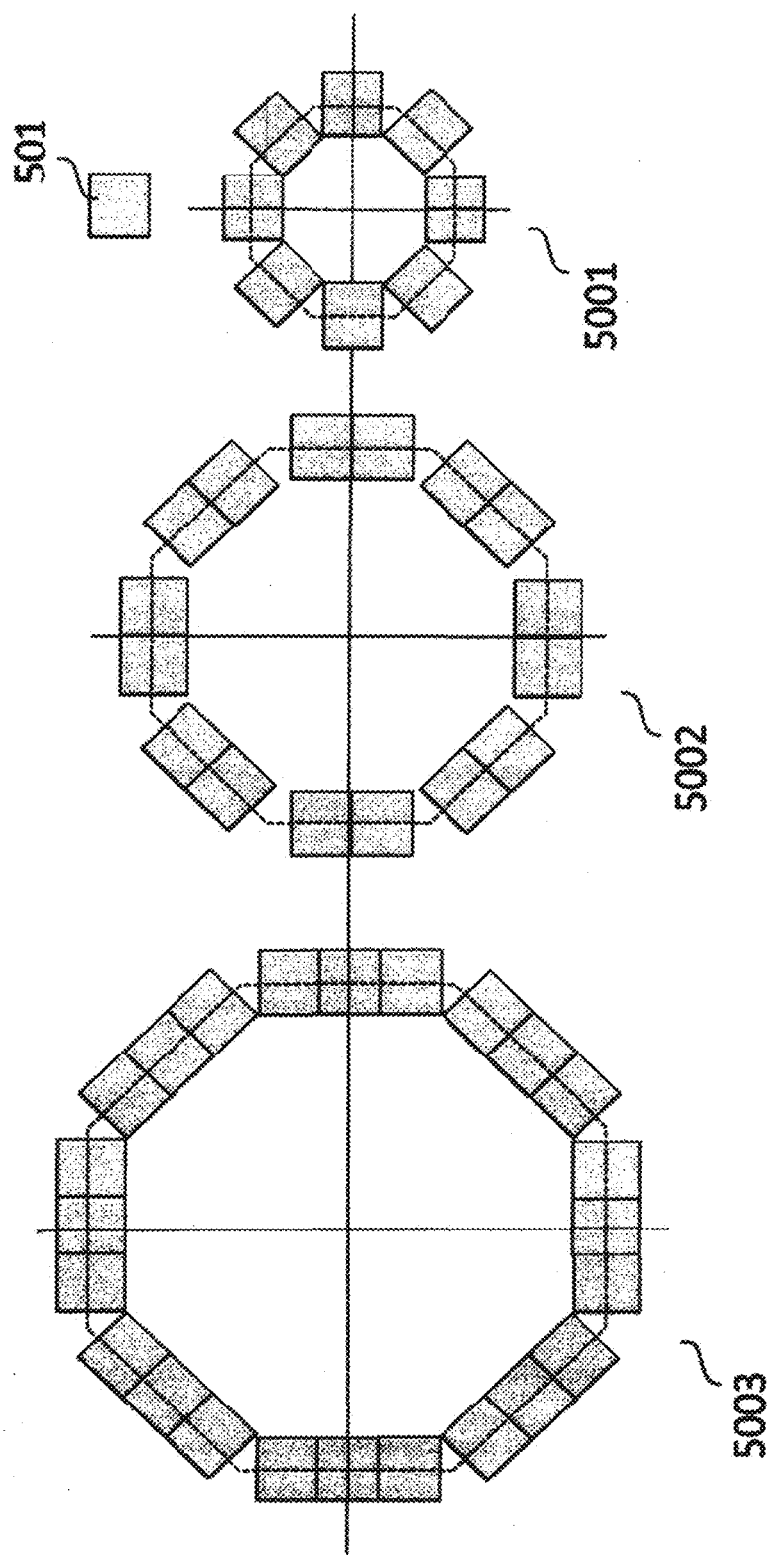
FIG. 6 is a front view showing the configuration of phosphor-plate small pieces and a phosphor layer used in a second exemplary embodiment of a phosphor wheel according to the present invention.

FIG. 6 is a front view showing the configuration of the phosphor-plate small pieces and the phosphor layer used in the second exemplary embodiment of a phosphor wheel according to the present invention.

A large number of phosphor-plate small pieces 501 having a square shape are prepared, and are arranged on a locus having a regular octagonal shape. Phosphor layer 5001 where each side thereof is formed of one small piece 501, phosphor layer 5002 where each side thereof is formed of two small pieces 501, and phosphor layer 5003 where each side thereof is formed of three small pieces 501 are shown. Phosphor layer 5001 corresponds to φ40, phosphor layer 5002 corresponds to φ70, and phosphor layer 5003 corresponds to φ90.

Figure 7:
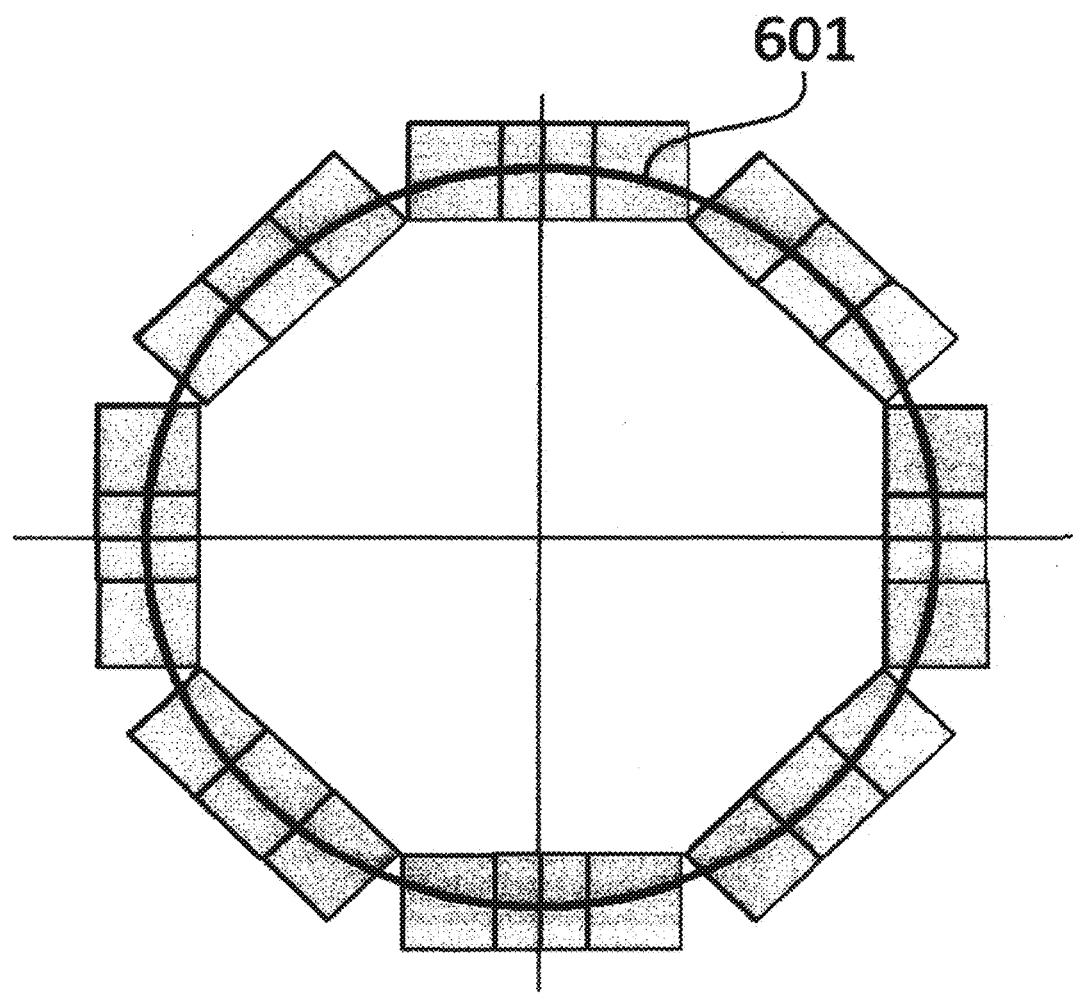
FIG. 7 is a view showing the position where excitation light is condensed when the phosphor wheel of the second exemplary embodiment of the present invention performs a rotation operation.

FIG. 7 is a view showing the position where excitation light is condensed when the phosphor wheel performs a rotation operation. The phosphor wheel includes a phosphor layer on which phosphor layer 5003 is formed, and each side of phosphor layer 5003 is formed of three small pieces 501. As shown in the drawing, the locus of the position irradiated with excitation light is a portion indicated by circle 601. Since each phosphor-plate small piece has a square shape, it is impossible to arrange the phosphor-plate small pieces to form an octagonal shape without a gap. However, in the case where a phosphor wheel is used as a light source which emits fluorescence, provided that a control is performed such that excitation light is turned off during a time when gaps between the phosphor plates are irradiated with excitation light, the phosphor wheel can be used in a projector as a light source which emits fluorescence. More importantly, in this exemplary embodiment, the manufacture of only small pieces 501 having a single shape allows the formation of phosphor wheels having different outer shapes. Accordingly, phosphor wheels can be efficiently produced and this is extremely beneficial to the manufacturer.

Third Exemplary Embodiment

In this exemplary embodiment, phosphor-plate small pieces having a square shape or a rectangular shape and phosphor-plate small pieces having a right triangular shape are combined with each other thus forming a phosphor layer where the phosphor plates are arranged without a gap as in the case of the first exemplary embodiment.

Figure 8:
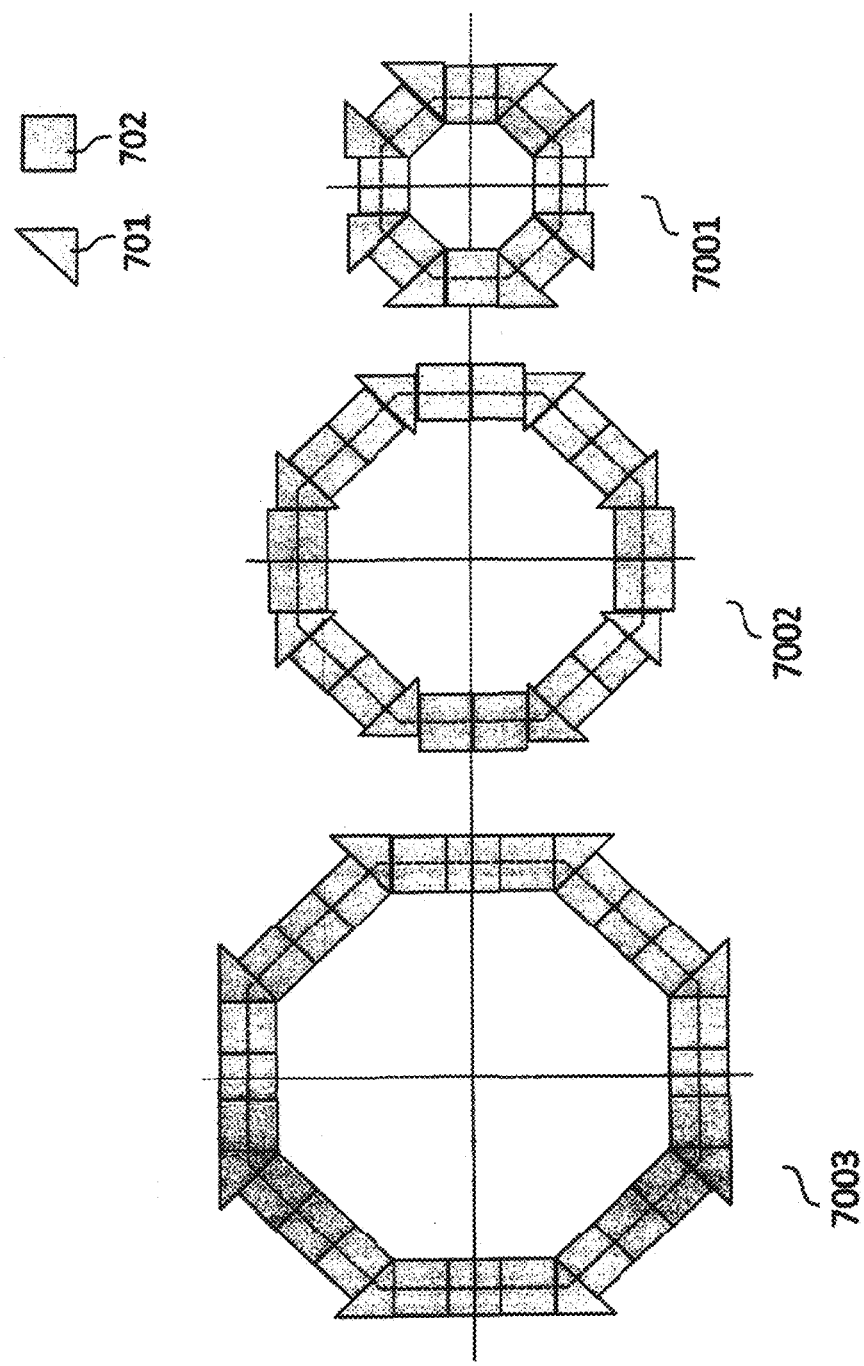
FIG. 8 is a front view showing the configuration of phosphor-plate small pieces and a phosphor layer used in a third exemplary embodiment of a phosphor wheel according to the present invention.

FIG. 8 is a front view showing the configuration of the phosphor-plate small pieces and the phosphor layer used in the third exemplary embodiment of a phosphor wheel according to the present invention.

As shown in FIG. 8, small pieces 702 having a square shape and small pieces 701 having a right triangular shape are prepared. Small piece 702 is split along a diagonal line thus obtaining two small pieces 701. By changing the combination of these small pieces, phosphor layers 7001, 7002, 7003 having different outer shapes can be obtained. Phosphor layer 7001 corresponds to ϕ40, phosphor layer 7002 corresponds to ϕ70, and phosphor layer 7003 corresponds to ϕ90. It is needless to say that a phosphor layer having an outer shape other than the above can be formed as a matter of course.

As described above, phosphor plates having a single quadrangular shape and small pieces having a right triangular shape which are obtained from the quadrangular phosphor plates are prepared, and these small pieces are arranged on a locus having a regular polygonal shape. With such operations, a phosphor layer where the small pieces are arranged without a gap can be formed. Accordingly, such a technique results in high productivity and can be used in an extremely flexible manner to produce phosphor layers having different outer shapes.

Fourth Exemplary Embodiment

In the first to third exemplary embodiments, the phosphor layers where the small pieces are arranged in a ring shape have been described. However, a phosphor layer having a shape where a portion of a ring shape is cut away may be used.

Figure 9:
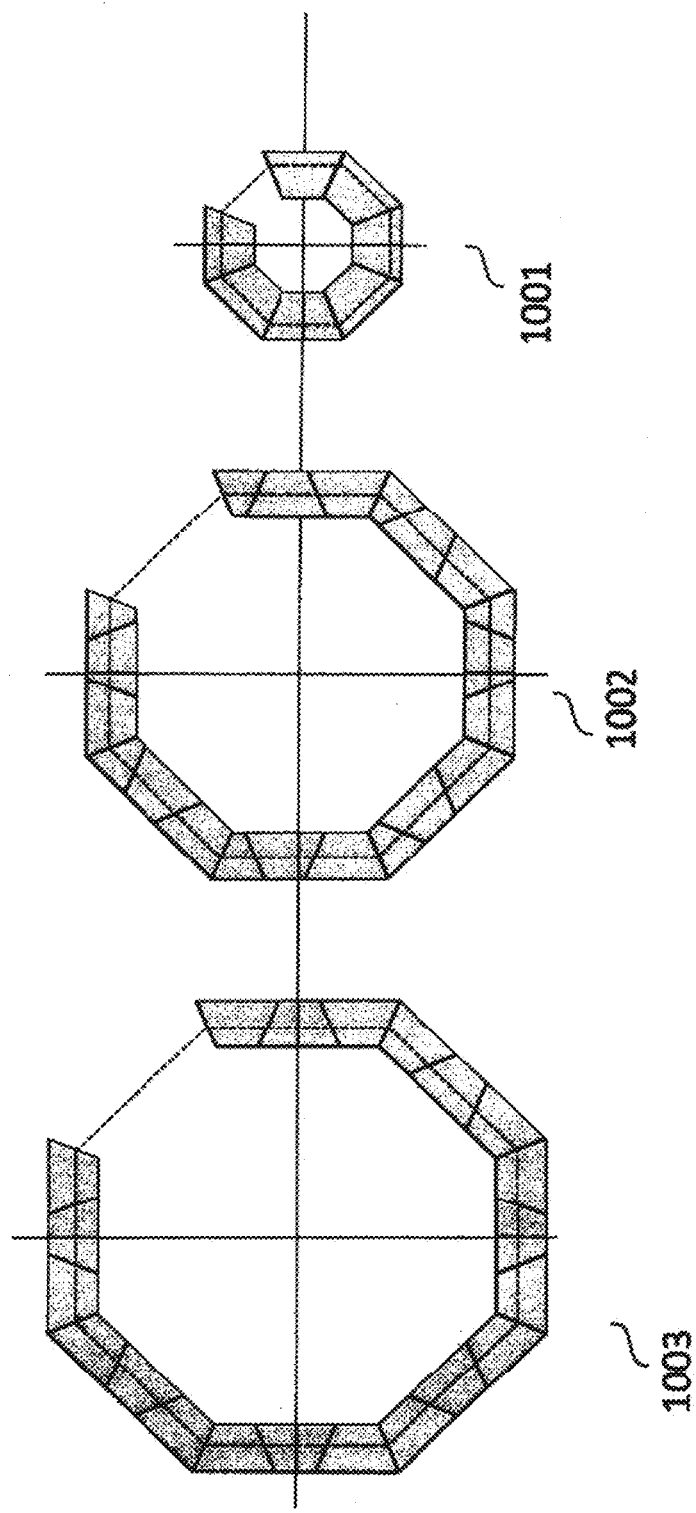
FIG. 9 is a front view showing the configuration of a phosphor layer used in a fourth exemplary embodiment of a phosphor wheel according to the present invention.

FIG. 9 is a front view showing the configuration of a phosphor layer used in a fourth exemplary embodiment of a phosphor wheel according to the present invention.

In a single-plate type DLP (registered trademark: Digital Light Processing) projector which uses a phosphor wheel, colored lights of red, green and blue are used in a time division manner. Accordingly, in a projector of this type, green fluorescence, yellow fluorescence or the like is not always necessary, and blue light which is excitation light may be directly used as illumination light. In this case, excitation light irradiating a cut-away portion of phosphor layer 1001, 1002, 1003 shown in FIG. 9 is made to reflect on or pass through the phosphor wheel, and the excitation light is used as colored light.

As in the case of this exemplary embodiment, when the phosphor layer has a regular polygonal shape as a whole, and is formed of small pieces, it is extremely easy to form a cut-away portion. In other words, this is because the same step is adopted where phosphor-plate small pieces adhere to a substrate in both the case of a phosphor layer having a polygonal ring shape and the case of a phosphor layer having a shape with a cut-away portion.

As a matter of course, the gaps naturally formed between the phosphor plates as in the case of the second exemplary embodiment may be assumed as cut-away portions, and excitation light which is made to reflect on or pass through the phosphor wheel may be used as colored light.

Fifth exemplary embodiment

Figure 10:
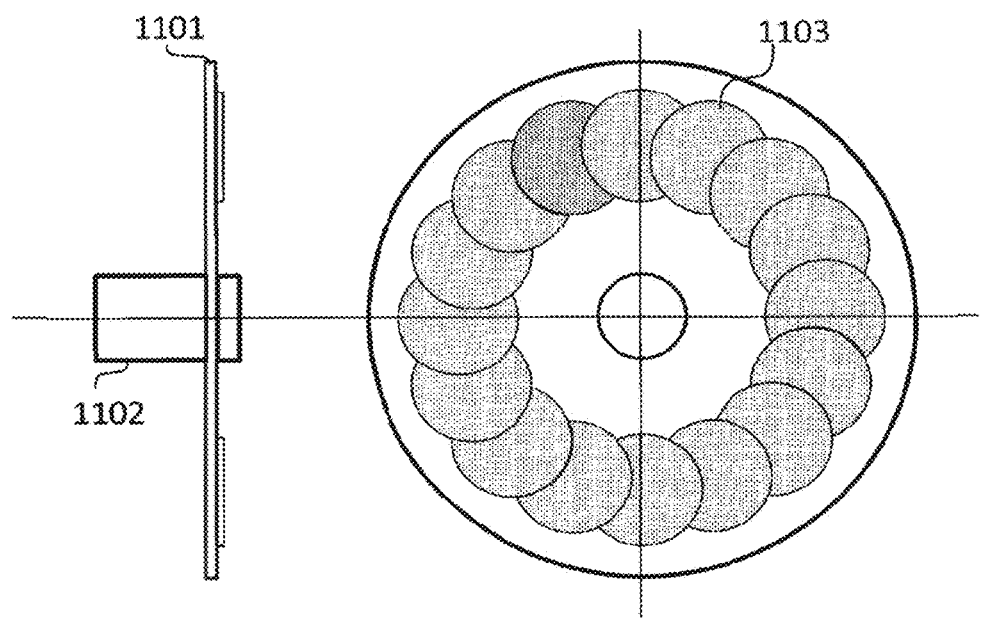
FIG. 10 is a side view and a front view showing the configuration of a fifth exemplary embodiment of a phosphor wheel according to the present invention.

FIG. 10 is a side view and a front view showing the configuration of the fifth exemplary embodiment of the phosphor wheel according to the present invention. As shown in the side view on the left side in FIG. 10, substrate 1101 is configured to be rotatable in combination with the motor 1102. As shown in the front view on the right side in FIG. 10, phosphor layer 1103 is formed on substrate 1101.

Substrate 1101 is formed of a metal plate, a glass plate or the like. Depending on the usage of the phosphor wheel, the phosphor wheel may be used as a reflective phosphor wheel or a transmissive phosphor wheel. A transmissive substrate or a reflective substrate may be properly employed according to the respective usage. A shape of the substrate may be a polygonal shape besides a circular shape.

Phosphor layer 1103 is made of a glass matrix and phosphor dispersed in the glass matrix. Inorganic phosphor particles are used for the phosphor. Phosphor is not particularly limited provided that the phosphor emits fluorescence under irradiation by excitation light. For example, an oxide phosphor, a nitride phosphor, an acid nitride phosphor, a sulfide phosphor, a garnet based compound phosphor or the like may be used. When blue light is used as excitation light, it is preferable to use a material which can obtain fluorescence of green light, yellow light, or red light.

Figure 11:
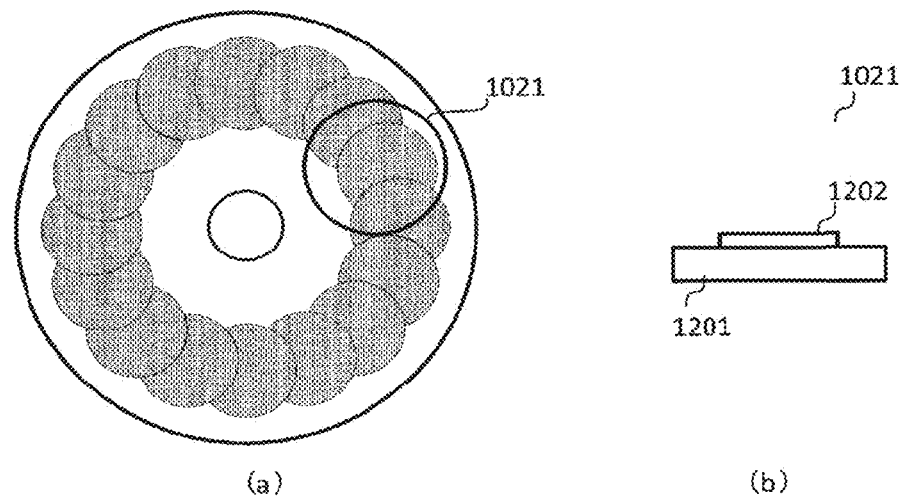

Explanation of the cross-sectional configuration of the phosphor wheel is described by taking a portion surrounded by circle 1021 in FIG. 11(a) as an example. As shown in FIG. 11(b), phosphor layer 1202 is formed on substrate 1201. When a phosphor wheel is used as a reflective phosphor wheel, a metal substrate, a transparent glass substrate or the like is used as substrate 1201. Assume that a surface of substrate 1201 which is in contact with phosphor layer 1202 is a front surface of substrate 1201, and a surface of substrate 1201 on the side which is not in contact with phosphor layer 1202 is a back surface of substrate 1201. In this case, a reflective layer is formed on the front surface side of substrate 1201 by vapor deposition, sputtering or the like. It is desirable for the reflective layer to have a property of reflecting light in a wavelength band of excitation light, and light in a wavelength band of fluorescence generated by excitation light. On the other hand, when a phosphor wheel is used as a transmissive phosphor wheel, it is desirable to form, on the front surface or the back surface of substrate 1201, a thin film having a property of allowing excitation light to pass therethrough, and a property of reflecting fluorescence. A thin film having such properties can be easily realized by a well-known technique.

As shown in FIG. 10, phosphor layer 1103 is a ring shape as a whole. Further, the ring shape is formed by arranging a plurality of small pieces 1302 shown in FIG. 12(b) in a connected manner around an axis of rotation of substrate 1201.

As shown in FIG. 12(a), each small piece 1302 is formed into a crescent-like shape which is obtained by cutting away overlapping portion 1303, formed between two circular phosphor plates 1301. The phosphor plate having such a shape is obtained as follows. A sintered body of an inorganic phosphor is obtained by the above-mentioned manufacturing method. The sintered body is sliced thus firstly obtaining phosphor plate 1301 having a disk shape. Then, phosphor plate 1301 is further cut so as to obtain small piece 1302 having a substantially crescent shape. Such a manufacturing method is also adopted in the same manner in manufacturing small pieces described in the following respective exemplary embodiments.

Figure 12:
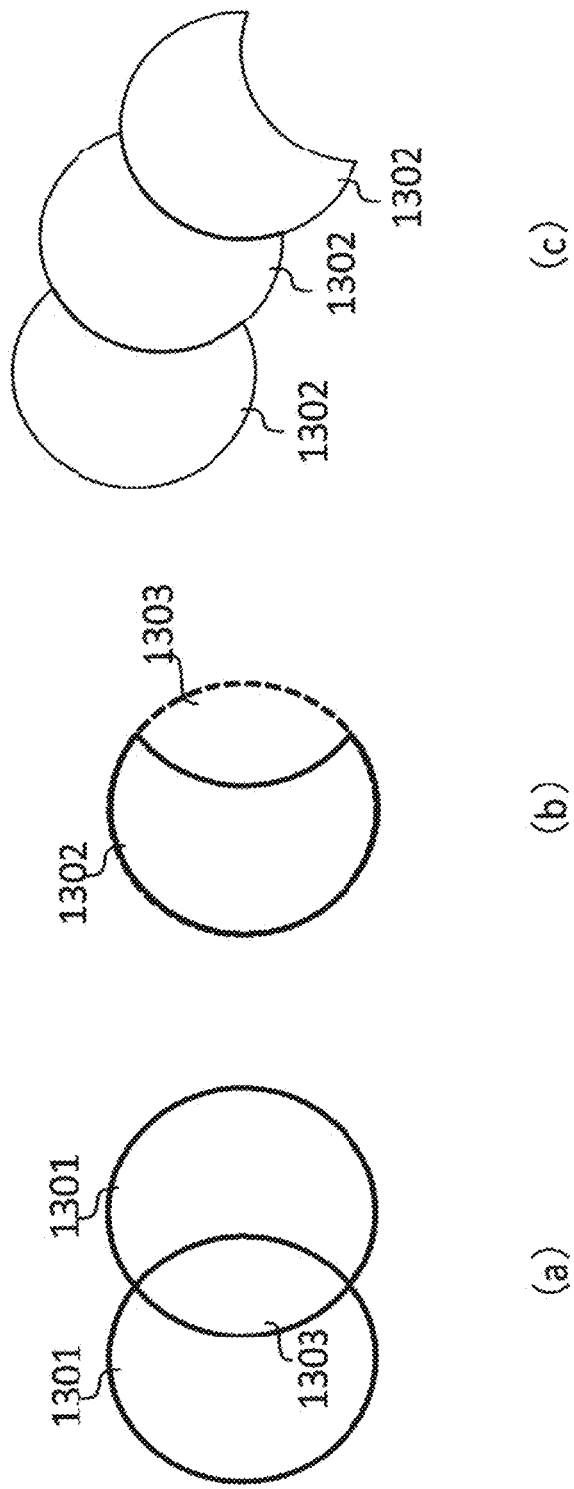
FIG. 12(a) to FIG. 12(c) are respectively views for describing small pieces 1302 used in the fifth exemplary embodiment of the phosphor wheel according to the present invention.

Small pieces 1302 having a crescent shape are arranged in a ring shape as a whole such that a cut-away portion of each small piece 1302 comes into contact with an arcuate portion of another phosphor plate. In other words, small pieces 1302 are arranged such that the cut-away portion of each small piece 1302 is filled by another small piece 1302. FIG. 12(*c*) is a view where three small pieces 1302 are arranged. By arranging a large number of small pieces 1302 without a gap and fixing small pieces 1302 to substrate 1101 by adhesion as described above, a phosphor wheel having a ring shape shown in FIG. 10 can be formed. Due to the structure of the phosphor wheel, a motor or the like is mounted at a center portion of the substrate and hence, the phosphor plate is formed into a ring shape. By changing the number of phosphor plates to be arranged without a gap corresponding to a size of substrate 1101, phosphor rings of various sizes can be formed. In forming phosphor rings of various sizes, regardless of rings having different sizes, the same phosphor-plate small pieces are used in forming all rings.

Figure 13:
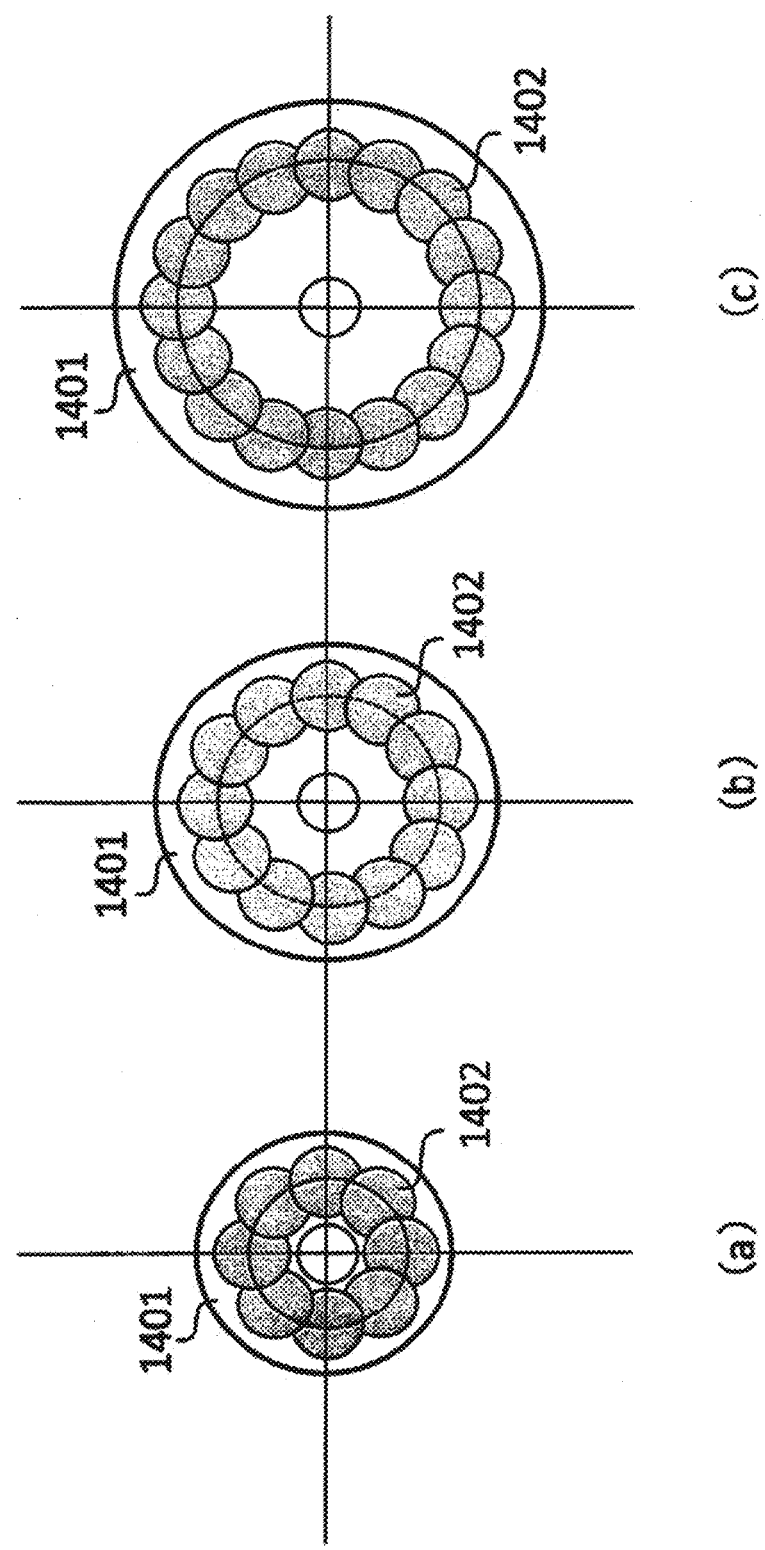
FIG. 13(a) to FIG. 13(c) are respectively views showing that phosphor wheels having various outer diameters are manufactured corresponding to the number of small pieces 1302 used in the arrangement.

FIG. 13(*a*) shows a phosphor wheel where eight small pieces 1302 having a crescent shape are arranged on substrate 1401 without a gap thus forming phosphor layer 1402 having a ring shape as a whole. FIG. 13(*b*) shows a phosphor wheel where twelve small pieces 1302 having a crescent shape are arranged on substrate 1401 without a gap thus forming phosphor layer 1402 having a ring shape as a whole. Further, FIG. 13(*c*) shows a phosphor wheel where sixteen small pieces 1302 having a crescent shape are arranged on substrate 1401 without a gap thus forming phosphor layer 1402 having a ring shape as a whole.

All small pieces 1302 which form phosphor layers 1402 shown in FIG. 13(*a*) to FIG. 13(*c*) have the same shape. Broken lines on the phosphor layers in FIG. 13(*a*) to FIG. 13(*c*) indicate positions where excitation light is condensed when the phosphor wheel performs a rotation operation. In FIG. 13, each circle indicates a position where excitation light is condensed, and it can be seen that the circles shown in FIG. 13(*a*), FIG. 13(*b*), and FIG. 13 (*c*) increase in size in this order. Even when small pieces 1302 having the same shape are used in this manner, by changing the number of small pieces 1302 used, phosphor wheels having various outer shapes can be manufactured. A size of small piece 1302 shown in FIG. 12(*b*) forming a base can be suitably changed. The size of small piece 1302 should be determined by taking into account a manufacturing facility for phosphor plate, material cost and the like. It is needless to say that even when a size of small piece 1302 is changed, a ring shape can be formed by arranging small pieces 1302. Excitation light is incident on circumferences indicated by broken lines in FIG. 13. In any example shown in FIG. 13(*a*), FIG. 13(*b*) or FIG. 13(*c*), small pieces 1302 are arranged without a gap. Accordingly, the phosphor is always irradiated with excitation light thus realizing a fluorescent source of high luminance which can continuously obtain fluorescence.

The important point in this exemplary embodiment is that, in principle, the manufacture of a phosphor layer requires only the preparation of a manufacturing facility and manufacturing steps for manufacturing small pieces 1302. That is, phosphor wheels having different outer shapes can be manufactured from small pieces 1302 having the same shape and the same size. Accordingly, productivity and the production yield can be enhanced and hence, the plan for producing projector devices can be changed in a flexible manner and, further, inventory problems can be reduced.

Figure 16:
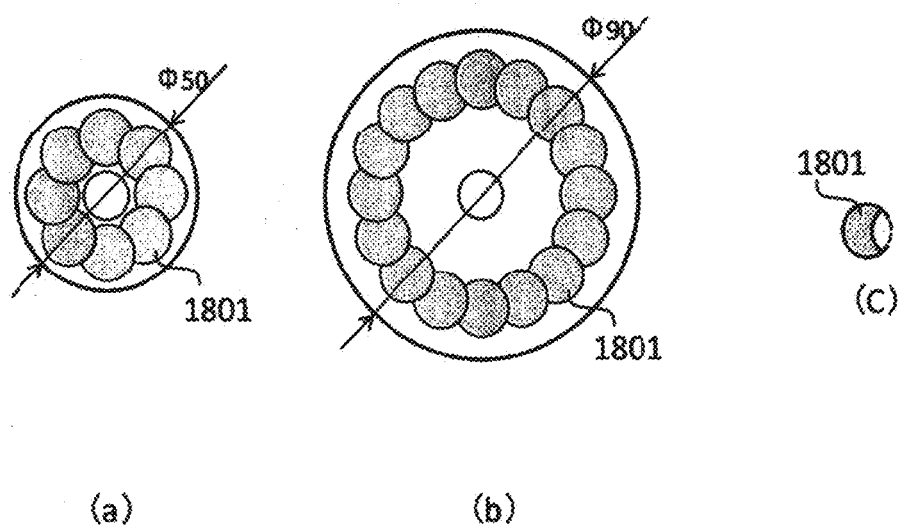
FIG. 16(a) to FIG. 16(c) are respectively views showing that phosphor wheels having various outer diameters are manufactured corresponding to the number of small pieces 1302 used in the arrangement.

FIG. 16(*a*) shows a phosphor wheel where eight small pieces 1801 are arranged on a phosphor wheel substrate of approximately ϕ50, and FIG. 16(*b*) shows a phosphor wheel where sixteen small pieces 1801 are arranged on a phosphor wheel substrate of approximately ϕ90. As shown in FIG. 16(*c*), each small piece 1801 has a shape obtained by cutting away a portion having an arc with ϕ17 from a disk-shaped phosphor plate with the same ϕ17. As described above, by arranging small pieces 1801 having the same shape in a ring shape, phosphor wheels having different sizes can be obtained by changing the number of small pieces 1801 to be arranged. Accordingly, the following advantageous effect can be expected. That is, productivity and the production yield can be enhanced and hence, the plan for producing projector devices can be changed in a flexible manner and, further, inventory problems can be reduced.

Sixth Exemplary Embodiment

In the fifth exemplary embodiment, the phosphor layer where the small pieces are arranged in a ring shape has been described. However, a phosphor layer having a shape where a portion of a ring shape is cut away may be used.

Figure 14:
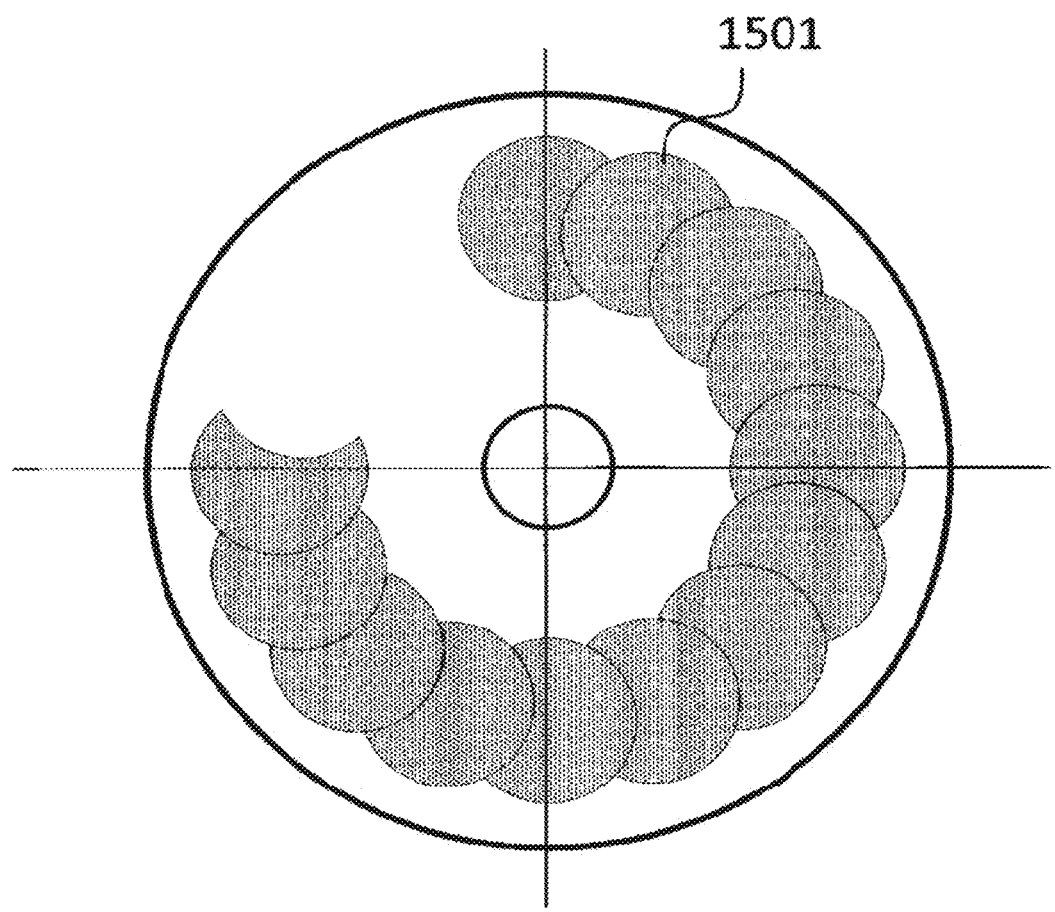
FIG. 14 is a front view showing the configuration of a phosphor layer used in a sixth exemplary embodiment of a phosphor wheel according to the present invention.

FIG. 14 is a front view showing the configuration of the phosphor layer used in the sixth exemplary embodiment of the phosphor wheel according to the present invention.

In a single-plate type DLP projector which uses a phosphor wheel, colored lights of red, green and blue are used in a time division manner. Accordingly, in a projector of this type, green fluorescence, yellow fluorescence or the like are not always necessary, and blue light which is excitation light may be directly used as illumination light. In this case, excitation light that irradiates a cut-away portion of phosphor layer 1501 shown in FIG. 14 is made to reflect on or pass through the phosphor wheel, and the excitation light is used as colored light.

As in the case of this exemplary embodiment, when the phosphor layer has a ring shape as a whole, and is formed of small pieces, it is extremely easy to form a cut-away portion. In other words, this is because the same step is adopted where phosphor-plate small pieces adhere to a substrate in both the case of a phosphor layer having a ring shape and the case of a phosphor layer having a shape with a cut-away portion.

Figure 15:
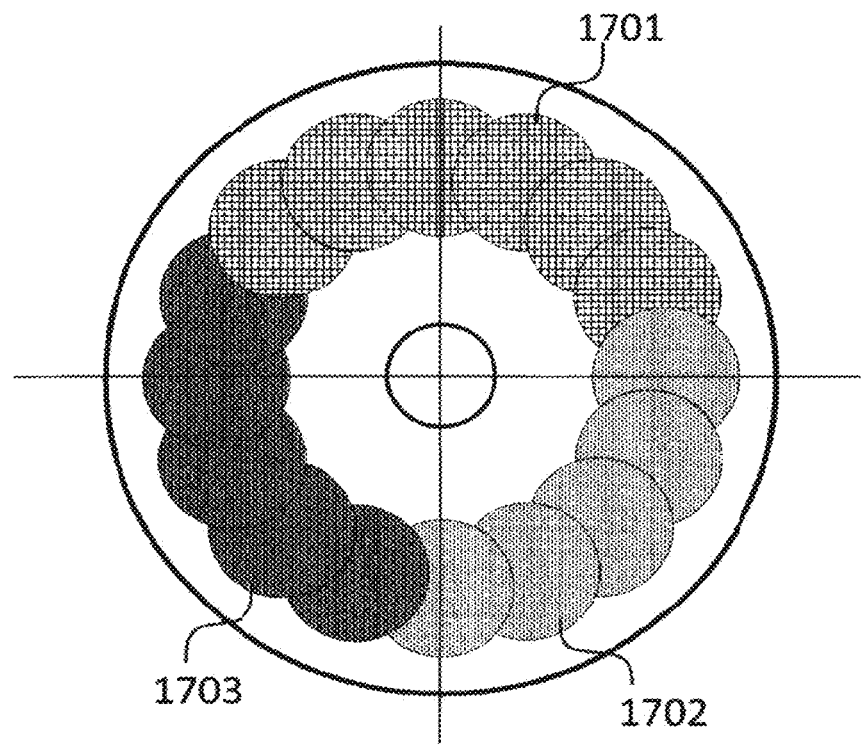
FIG. 15 is a view showing the configuration of a phosphor wheel formed using small pieces which generate fluorescence in different colors.

Further, besides the configuration where phosphor small pieces adhere to the substrate are formed of only small pieces which emit fluorescence of the same color, a configuration may be also adopted which is formed of small pieces which emit fluorescences of different colored lights in a mixed manner. Phosphor wheel shown in FIG. 15 is formed of small pieces 1701 which emit yellow fluorescence, small pieces 1702 which emit green fluorescence, and small pieces 1703 which emit red fluorescence. With such a configuration, yellow light, green light and red light can be formed in a time division manner corresponding to the rotation of the phosphor wheel. With such a configuration, a phosphor wheel and a light source device which use the phosphor wheel can be miniaturized, and can improve performance.

Seventh Exemplary Embodiment

Figure 17:
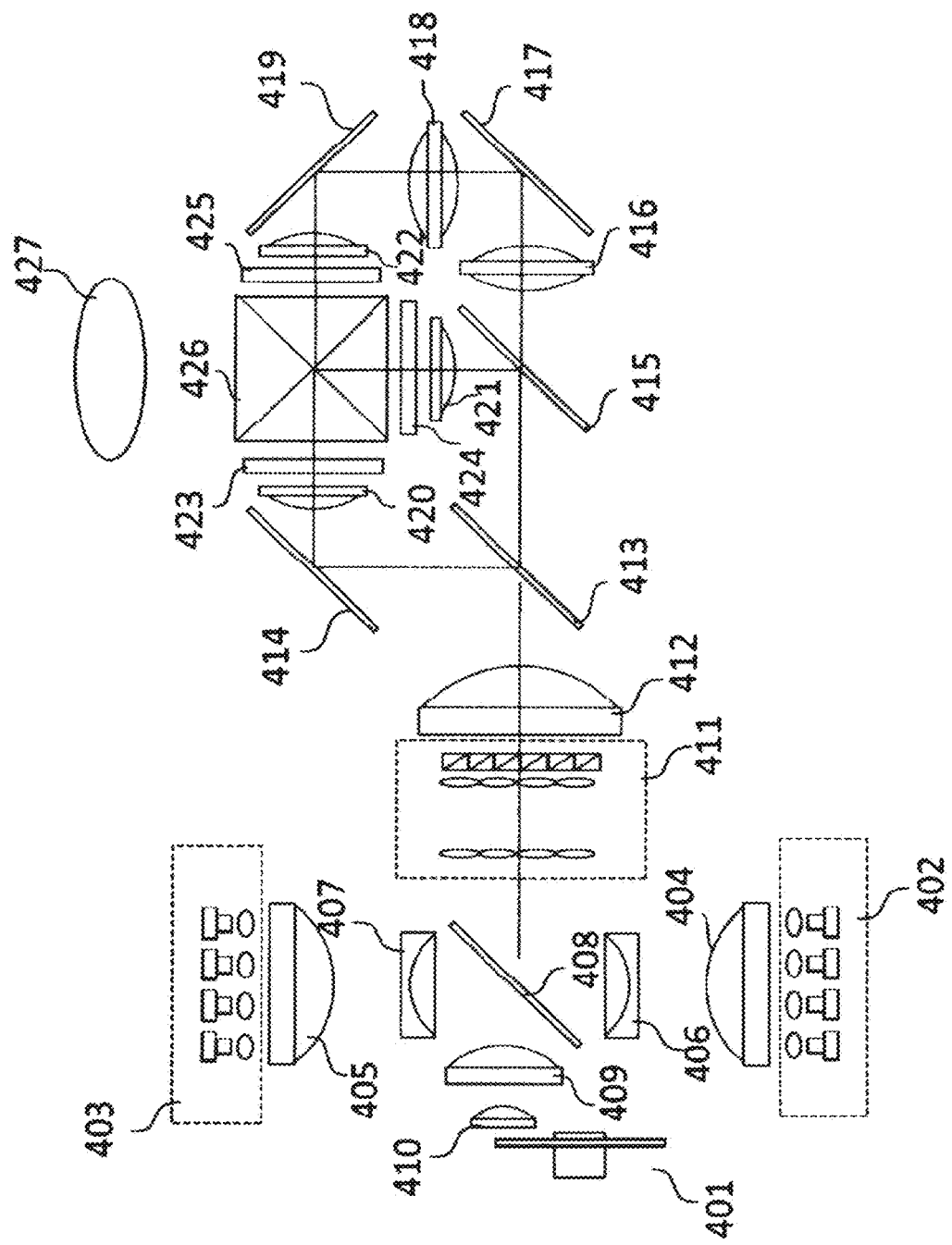
FIG. 17 is a view showing the configuration of a projector which uses a phosphor wheel.

FIG. 17 is a view showing the configuration of a projector which uses the phosphor wheel shown in the respective above-mentioned exemplary embodiments. The projector of this exemplary embodiment is a projector which uses the phosphor wheel described in the first exemplary embodiment and three LCDs (Liquid Crystal Displays).

The projector of this exemplary embodiment includes: laser light sources 402, 403 which emit blue color; condensing lens systems 404, 405, 406, 407, 409, 410; field lens 412; dichroic mirror 408; phosphor wheel 401; polarization conversion optical system 411; dichroic mirrors 413, 415; reflection mirrors 414, 417, 419; relay lens systems 416, 418; condenser lenses 420, 421, 422; liquid crystal panels 423, 424, 425; cross dichroic prism 426; and projection lens 427.

Laser light source 403 is a blue laser which supplies excitation light of a phosphor. A single laser light source 403 may be used. Alternatively, a plurality of laser light sources 403 may be used. With the use of the plurality of laser light sources 403, the intensity of excitation light increases.

Laser light source 402 is a light source which supplies blue color to the liquid crystal panels for blue. Laser light source 402 is not used for excitation light to phosphor wheel 401.

In the system of excitation light, condensing lens systems have the role of condensing excitation light onto phosphor wheel 401 and the role of collimating emitted fluorescence. In the system of laser light source 402 which is a blue illumination light source, the condensing lens systems have the role of making an optical flux, which is incident on a polarization conversion element, parallel.

Phosphor wheel 401 has the configuration described in the first exemplary embodiment, and a phosphor layer where yellow phosphor is formed without a gap is used. Accordingly, yellow fluorescence is continuously generated. Such light and blue light from laser light source 402 are merged, and are incident on the polarization conversion element forming polarization conversion optical system 411 so that it is possible to obtain illumination light having a uniform polarization direction. The operation of an optical system which is performed after the polarization conversion element is substantially equal to the operation of a three-plate type projector which uses a well-known discharge lamp and hence, the description of such operations is omitted.

In general, a manufacturer of projectors constitutes a product lineup having different display panel, light source output, or display performance. Accordingly, it is often necessary to prepare the manufacturer to prepare optical components to be used in products having a different specification such as a sizes or an outer shape. To meet such a demand, the present invention can flexibly provide phosphor wheels having different specifications with favorable productivity at high yields. Therefore, the present invention can provide an advantageous effect of contributing to corporate profits.

The exemplary embodiments of the present invention have been described heretofore. However, for example, the small pieces having a polygonal shape described in the first to fourth exemplary embodiments may be formed of small pieces which generate different fluorescences as in the case of the small pieces shown in FIG. 15. The configuration which can be realized by combining the exemplary embodiments as described above is also included in the present invention.

The present invention has been described with reference to respective exemplary embodiments. However, the present invention is not limited to the above-mentioned exemplary embodiments. The configuration or the details of the present invention contain modifications understandable to those skilled in the art within the scope of the present invention. This application claims priority based on International Application No. PCT/JP2015/081586 filed on Nov. 10, 2015, the entire disclosure of which is incorporated herein by reference.

REFERENCE SIGNS LIST 101, 201, 301 substrate
102, 202 motor
103, 203, 303 phosphor layer
401 phosphor wheel
402, 403 laser light source
404, 405, 406, 407, 409, 410 condensing lens system
412 field lens
408 dichroic mirror
411 polarization conversion optical system
413, 415 dichroic mirror
414, 417, 419 reflection mirror
416, 418 relay lens system
420, 421, 422 condenser lens
423, 424, 425 liquid crystal panel
426 cross dichroic prism
427 projection lens
501, 701, 702, 801, 802, 1302, 1701 to 1703, 1801 (phosphor-plate) small piece

The invention claimed is:

1. A phosphor wheel having a phosphor provided on a rotatable substrate, wherein
said phosphor is formed of a plurality of small pieces,
said small pieces have a shape obtained by cutting away a portion from a substantially disk shape, and are formed around an axis of rotation of said substrate, and
a portion of each small piece of the plurality of small pieces that is cut away from the substantially disk shape comes into contact with an other small piece of the plurality of small pieces.

2. The phosphor wheel according to claim 1, wherein said plurality of small pieces are arranged around the axis of rotation of said substrate.

3. The phosphor wheel according to claim 1, wherein another of said small pieces is formed so as to fill a portion of said small piece that is cut away from said substantially disk shape.

4. The phosphor wheel according to claim 1, wherein the substantially disk shape has a first arc that is concave in a first direction, and said small piece has a shape obtained by cutting the substantially disk shape along a second arc that is concave in a second direction opposite the first direction and has a length that is equal to a length of the first arc.

5. The phosphor wheel according to claim 1, wherein said small piece has a crescent shape.

6. The phosphor wheel according to claim 1, wherein said small pieces are a plurality of kinds of small pieces that generate different fluorescences.

7. The phosphor wheel according to claim 1, wherein said small piece is an inorganic phosphor, and is fixed to said substrate by adhesion.

8. The phosphor wheel according to claim 1, wherein said substrate is formed of a transparent substrate,
comprising a reflection film which reflects fluorescence generated by said phosphor between said substrate and said phosphor.

9. The phosphor wheel according to claim 1, wherein the substrate is formed of a metal substrate, comprising a reflection film which reflection film reflects fluorescence generated by said phosphor between said substrate and said phosphor.

10. A projector comprising said phosphor wheel described in claim 1.

11. The phosphor wheel according to claim 1, wherein the phosphor comprises a phosphor layer having a ring shape.

12. The phosphor wheel according to claim 1, wherein the substantially disk shape comprises a circular shape.

13. The phosphor wheel according to claim 1, wherein the plurality of small pieces are arranged in a ring shape in an interlocking configuration.

14. The phosphor wheel according to claim 4, wherein the second arc of a first small piece of the plurality of small pieces contacts the first arc of a second small piece of the plurality of small pieces.

15. A method of manufacturing a phosphor wheel having a phosphor provided on a rotatable substrate, said method comprising:

forming said phosphor having a shape obtained from a plurality of small pieces, which are arranged around an axis of rotation of said substrate, by cutting away a portion from a substantially disk shape, wherein a portion of each small piece of the plurality of small pieces that is cut away from the substantially disk shape comes into contact with an other small piece of the plurality of small pieces.

16. A phosphor wheel having a phosphor provided on a rotatable substrate, wherein said phosphor is formed of a plurality of small pieces, said small pieces have a shape obtained by cutting away a portion from a substantially disk shape, and are formed around an axis of rotation of said substrate, and each small piece of the plurality of small pieces has the same shape and the same size, respectively.

17. A method of manufacturing a phosphor wheel having a phosphor provided on a rotatable substrate, said method comprising:

forming said phosphor having a shape obtained from a plurality of small pieces, which are arranged around an axis of rotation of said substrate, by cutting away a portion from a substantially disk shape, wherein each small piece of the plurality of small pieces has the same shape and the same size, respectively.

* * * * *